United States Patent [19]

Brabbs et al.

[11] Patent Number: 4,503,080

[45] Date of Patent: * Mar. 5, 1985

[54] DOUGHS AND COOKIES PROVIDING STORAGE-STABLE TEXTURE VARIABILITY

[75] Inventors: William J. Brabbs, Cincinnati; Charles A. Hong, Deerfield Township, both of Ohio

[73] Assignee: The Procter & Gamble Company, Cincinnati, Ohio

[ * ] Notice: The portion of the term of this patent subsequent to Jun. 19, 2001 has been disclaimed.

[21] Appl. No.: 466,822

[22] Filed: Feb. 16, 1983

Related U.S. Application Data

[63] Continuation-in-part of Ser. No. 396,525, Jul. 8, 1982, and Ser. No. 240,051, Mar. 3, 1981, Pat. No. 4,455,333, which is a continuation-in-part of Ser. No. 220,643, Dec. 29, 1980, abandoned, which is a continuation-in-part of Ser. No. 107,229, Dec. 26, 1979, abandoned.

[51] Int. Cl.$^3$ .............................................. A21D 13/08
[52] U.S. Cl. ...................................... 426/94; 426/502; 426/496; 426/560
[58] Field of Search ................. 426/94, 502, 496, 560, 426/103, 549, 658, 20, 64, 28, 61, 64; 435/168

[56] References Cited

U.S. PATENT DOCUMENTS

| | | | |
|---|---|---|---|
| 1,355,129 | 10/1920 | Corby | 426/549 |
| 2,975,059 | 3/1961 | Andrews | 426/555 |
| 3,198,637 | 8/1965 | Harris et al. | 426/94 |
| 3,250,625 | 5/1966 | Thelen | 426/94 |
| 3,250,626 | 5/1966 | Thelen | 426/94 |
| 3,689,280 | 9/1972 | Werner | 426/86 |
| 3,851,084 | 11/1974 | Rossen et al. | 426/343 |
| 3,917,856 | 11/1975 | Wong et al. | 426/94 |
| 4,137,336 | 1/1979 | Radlove | 426/658 |
| 4,291,065 | 9/1981 | Zobel et al. | 426/549 |
| 4,374,862 | 2/1983 | Hong et al. | 426/94 |

FOREIGN PATENT DOCUMENTS

| | | | |
|---|---|---|---|
| 2414177 | 9/1975 | Fed. Rep. of Germany | 426/94 |
| 2511847 | 9/1976 | Fed. Rep. of Germany | 426/658 |

OTHER PUBLICATIONS

Bakery Technology & Engineering, S. A. Matz ed., The AVI Publishing Co., Inc., Westport, CT (1960), pp. 407–411, 427, 448.

Redfern and Hickenbottom, "Levulose-Containing Corn Syrups for the Baker", The Bakers Digest, Apr. 1972, pp. 26–31.

The Fructose Cookbook, M. Cannon, East Woods Press Books, Charlotte, N.C., pp. 101–112, (1979).

Primary Examiner—Raymond Jones
Assistant Examiner—Elizabeth A. King
Attorney, Agent, or Firm—Nancy S. Mayer; Rose Ann Dabek; Richard C. Witte

[57] ABSTRACT

Cookie products having a storage-stable plurality of textures, comprising (1) discrete regions providing a stable, crisp texture; and (2) discrete regions providing a stable, chewy texture are disclosed. A method for the generation of the plurality of textures requires a process for inhibiting sugar crystallization in parts of the product.

35 Claims, 5 Drawing Figures

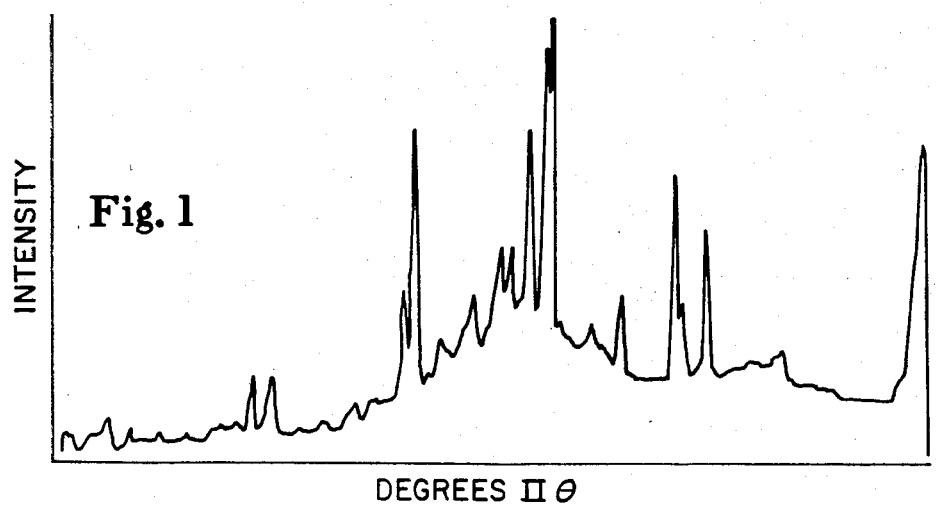

DOUGHS AND COOKIES PROVIDING STORAGE-STABLE TEXTURE VARIABILITY

This is a continuation-in-part of the prior copending U.S. patent application Ser. No. 396,525, filed July 8, 1982, and Ser. No. 240,051, filed Mar. 3, 1981, which is a continuation-in-part of Ser. No. 220,643, filed Dec. 29, 1980, the latter being a continuation-in-part of Ser. No. 107,229, filed Dec. 26, 1979. U.S. patent application Ser. Nos. 107,229 and 220,643 have been abandoned. U.S. patent application Ser. No. 240,051 issued as U.S. Pat. No. 4,455,333 on June 19, 1984.

TECHNICAL FIELD

The present application relates to baked food products, in particular, cookies. Fresh, home-baked cookies are the standard of excellence in the cookie world. An important feature of most fresh, home-baked cookies is their texture, specifically, a crisp, friable outside surface and a ductile interior. The inside contains pockets of super-saturated sugar solution (syrup) which are ductile and are sometimes visible as strands when the cookie is pulled apart Unfortunately, within a few weeks, or less, such cookies undergo a spontaneous and irreversible process of degradation, becoming hard and crumbly throughout. The following describes the physico-chemical processes which have now been discovered to occur during cookie baking and subsequent storage.

Prior to baking, a cookie dough consists of a hydrated mixture of flour, shortening (fat), sugar, and minor adjunct ingredients. During baking, sugar and water appear to be primary interactants. The flour (starch and protein) is of less importance because it holds less water, relative to the sugar, at oven temperature.

When the cookie dough enters the oven, the water in the dough is saturated with sugar and appears to be evenly distributed throughout the dough. As the water temperature increases during baking, the solubility of the sugar increases, drawing water away from the flour. At about 70° C. all the water present has the capacity to dissolve all the sugar, as indicated by the fact that the X-ray diffraction pattern for crystalline sugar is lost. As the cookie temperature continues to increase (80° C.), a non-saturated sugar solution is formed from which the water is free to evaporate. At this point, water is rapidly lost to the atmosphere until the solution is again saturated (0.18 gram water/gram sugar). This occurs typically after about eight minutes of baking. If baking is continued, typically to the twelve minute point, the dehydration continues and a dry (0.1 gram water/gram sugar) crunchy cookie is produced, containing amorphous sugar that cannot crystallize because its water content is too low.

When a typical cookie baked eight minutes is removed from the oven (100°–105° C.), most of the water is held as the hot saturated sucrose syrup. Upon cooling, this syrup becomes super-saturated, holding the water within the cookie. It is this wet syrup that gives the cookie its fresh, chewy eating quality. During the subsequent 24 hours, the sugar begins to crystallize spontaneously, and water migrates from the interior, where the water activity is relatively high, toward the moisture-depleted outer surface. During the first one to six days after baking, moisture continues to equilibrate throughout the cookie, transferring through the starch matrix. As the water activity, $a_w$, reaches about 0.6, the sugar is almost fully crystallized and the starch is tactilely dry.

As time goes on, cross-sectional equilibrium is essentially reached. Unlike bread staling, these latter changes in a cookie cannot be reversed by heating, indicating that the starch in the cookie is not undergoing retrogradation.

It would be of value, therefore, to provide cookies which, after having reached substantial textural equilibrium, still demonstrate strong texture differences between crisp regions and chewy regions. This difference should be substantial, so that it is perceivable by consumers, and storage stable, so that it is suitable for production in a commercial manufacturing-marketing milieu.

Currently, nearly all feasible cookie formulations which get crisp on the outside will eventually reach that same degree of crispness throughout, reverting, by water loss and sugar crystallization, to the dry, hard texture of popular ready-to-serve cookies. Most home recipe cookies will reach this totally crisp state within one or two weeks, regardless of the temperature or relative humidity at which they are stored, since the changes involved in cookie hardening are internal to the cookie and are thus independent of the cookie's external environment. Most ready-to-serve cookies are simply baked out to a crisp end point immediately to facilitate subsequent handling.

Cookies can be formulated to be soft and moist by high shortening and/or high water formulas. However, such cookies have only limited microbial stability, do not stay crisp on the outside, and present major problems of stickiness and crumbliness.

Another approach taken within the cookie industry has been to supply a moistness impression by using coatings and/or fillings, e.g., fig bars. However, such techniques are clearly inapplicable in the case of drop-type home recipe cookies, such as chocolate chip, peanut butter, oatmeal and sugar cookies and other cookies which have a substantially homogeneous cross-section with respect to flavor and appearance.

Prior art efforts have failed to provide more than a remote imitation of the crisp/chewy texture dichotomy which, until now, made fresh, homemade cookies unique and highly preferred. This invention not only provides an excellent approximation of this textural dichotomy, but provides it in a shelf-stable form uniquely adapted to the marketing milieu of ready-to-serve cookies.

It has now been discovered, for example, that by making cookies from a plurality of doughs, one containing readily crystallizable sugar in combination with a sugar crystallization inhibitor, and another a conventional readily crystallizable sugar-containing dough, in such a manner that the two doughs remain segregated in discrete regions within the unbaked cookie, a matrix is formed which can be baked to a cookie having portions which provide a crisp texture and portions which provide a chewy texture. It has also been discovered that consumer perception of cookie freshness has only a limited relationship to the spatial orientation and organization of the two types of doughs/textures within the cookie.

By the practice of this invention, a texture profile is provided which is stable to aging, so long as packaging integrity is maintained, and very closely approximates the organoleptic properties of a freshly baked homemade cookie. Properly executed, these cookies can be made to give the appearance of a conventional homogeneous system, with little or no visual evidence of a multi-part structure.

BACKGROUND ART

The use of fructose, present in invert sugars and honey, in the making of cookies is widely known among those with cooking and baking experience. In addition, fructose nominally is about 1.4 times as sweet as sucrose, and has therefore been incorporated in so-called "dietetic" baking recipes. See, for example, U.S. Pat. No. 4,137,336, S. B. Radlove, issued Jan. 30, 1979.

Layered cookies are well-known. For example, Oreo TM —type filled cookies are sandwich-structured. Similarly, fig bars involve a center-filled structure in which the center portion of the cookies is of an entirely different composition than the outer shell. These cookies differ, not only in structure, but also in flavor and appearance, from the unitary cookies of the present invention.

U.S. Pat. Nos. 3,250,625 and 3,250,626, issued May 10, 1966 to Ray J. Thelen, describe cooked, leavened food laminates, of the type and texture characteristic of raised dough products such as breads, rolls, cakes, and the like. One of the materials laminated in the Thelen patents contains low levels of honey, while the others contain sucrose.

U.S. Pat. No. 3,198,637, issued Aug. 3, 1965, to M. C. Harris et al., describes the preparation of filled baked products and the filler composition used therein.

DESCRIPTION OF THE FIGURES

FIG. 1 represents an X-ray diffraction pattern of aged Toll House TM cookies, which represents the reference composition of Example 1. Viewing the pattern from right to left, the initial peak of the figure represents engagement of the instrument and is not representative of crystal structure. All remaining peaks correspond to sugar crystals present in the cookie sample.

FIG. 2 represents an X-ray diffraction pattern of the aged cookies of Example 1 comprised solely of baked inner dough wherein the inner dough formula is equivalent to the Toll House TM formula except that 50% by weight of the sucrose was replaced with sucrose monooleate. Viewing the pattern from right to left, the initial peak of the figure represents engagement of the instrument and is not representative of crystal structure. The absence of the sharp peaks in the remainder of the pattern as seen in FIG. 1 demonstrates that sugar crystallization in the cookies was inhibited by the sucrose monooleate.

FIG. 3 represents an X-ray diffraction pattern of the aged cookies of Example 2 comprised solely of baked inner dough wherein the inner dough formula is equivalent to the Toll House TM formula except that 50% by weight of sucrose was replaced with a starch hydrolysate manufactured by Lonza, Inc., 22-10 Route 208, Fair Lawn, N.J. 04710, known commercially as Polyol 6075. Viewing the pattern from right to left, the initial peak of the figure represents engagement of the instrument and is not representative of crystal structure. The absence of sharp peaks in the remainder of the pattern corresponds to the absence of sugar crystals. Polyol 6075 acted as an effective crystallization inhibitor.

DISCLOSURE OF THE INVENTION

Figure 4:
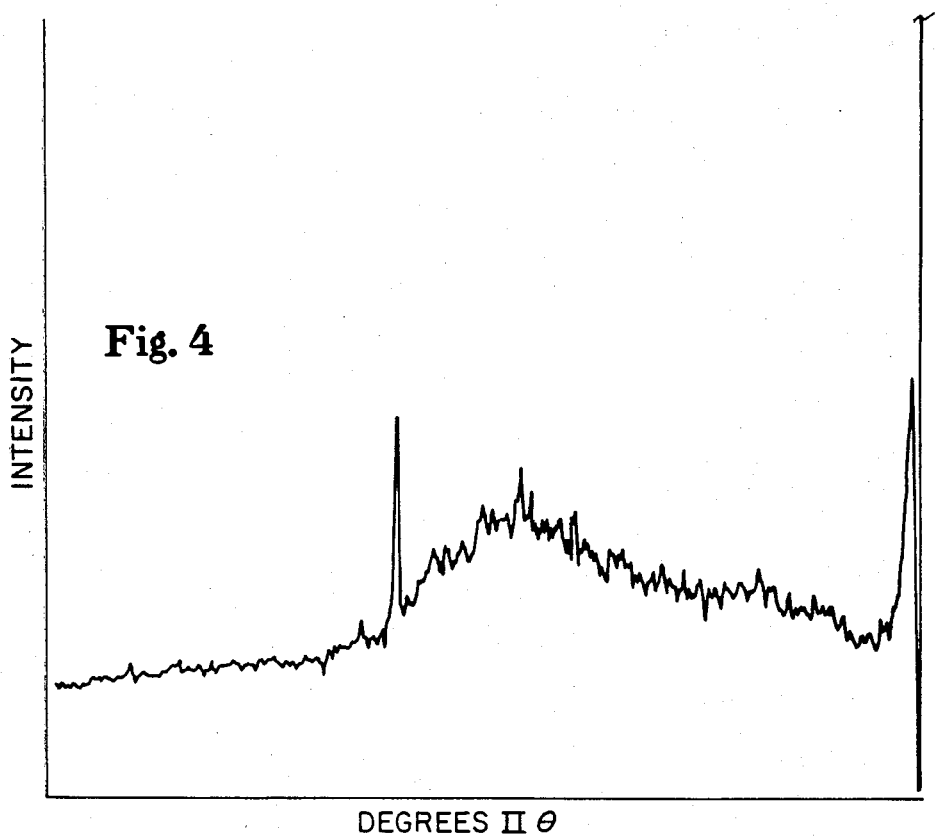
FIG. 4 represents an X-ray diffraction pattern of the aged cookies of Example 2 comprised solely of baked inner dough wherein the inner dough formula is equivalent to the Toll House TM formula except that 50% of the sucrose was replaced with a Lonza, Inc. starch hydrolysate known commercially as Polyol HM75. Viewing the pattern from right to left, the initial peak of the figure represents engagement of the instrument and is not representative of crystal structure. The decrease in the number of sharp peaks overall demonstrates a decrease in the presence of sugar crystals due to inhibition of sugar crystallization.

The present invention provides a sweetened food product in the form of a cookie dough preform, or the like, which, when baked, provides a storage-stable plurality of textures, the cookies made therefrom, and a method for generating the plurality of textures through inhibition of sugar crystallization. The unbaked product comprises a matrix made from cookie ingredients, and characterized in having distributed therein discrete regions of dough containing readily crystallizable sugar, and discrete regions of dough containing readily crystallizable sugar and a sugar crystallization inhibitor for the readily crystallizable sugar, whereby the product, when baked, provides a storage-stable plurality of textures, the regions containing crystallization inhibitor providing a chewy texture, and the regions not containing crystallization inhibitor providing a crisp texture. The dough products of this invention can be packaged and stored, preferably refrigerated or frozen, for baking by the consumer. Such dough products, when baked, produce cookies which, after equilibration, retain a crisp/chewy texture profile over long periods of time, when stored in sealed containers.

The invention also provides a baked, sweetened food product in the form of a cookie, comprising a crumb-continuous matrix made from cookie ingredients, and characterized in having distributed therein discrete regions of crumb containing crystallized sugar and discrete regions of crumb containing uncrystallized readily crystallizable sugar and a sugar crystallization inhibitor for the readily crystallizable sugar, whereby the product provides a storage-stable plurality of textures, the regions containing crystallized sugar providing a crisp texture and the regions containing uncrystallized sugar providing a chewy texture. The dough products of this invention can be baked into cookies by the manufacturer. The cookies, when packaged in relatively air- and moisture-tight containers, provide the plurality of textures they had when freshly baked, for periods of up to several months, and longer.

The cookies of this invention are of the "crumb-continuous" type which typically have a relatively uniform distribution of the crumb ingredients throughout the cookie, e.g. oatmeal cookies, chocolate chip or Toll House TM cookies, peanut butter cookies, sugar cookies, and other drop-type cookies. This is in distinction to the filled, coated, and sandwich-type cookies known to the art.

This invention further comprises a method for generating a storage-stable plurality of textures within baked goods such as cookies by inhibiting crystallization of a readily crystallizable sugar contained therein. The process of inhibiting crystallization of a readily crystallizable sugar contained in a dough-based food product comprises adding an effective amount of a crystallization inhibitor to the dough preform or to the baked product. The crystallization inhibitor can be added as an ingredient in dough preparation or can be injected into the dough preform or baked product.

By "storage-stable" is meant that the cookies produced by the practice of this invention, after reaching substantial textural equilibrium, retain a plurality of textures for extended periods. Depending upon their formulation, cookies prepared by the practice of this invention will, after equilibration, retain their original texture for periods ranging from weeks, at a minimum, to many months, or even indefinitely, with proper packaging and maintenance of package integrity. This is to be distinguished from those cookies which lose their texture differences over a period of from a few days to a few weeks, even when stored in air- and moisture-tight containers. It is also to be distinguished from those cookies which are baked to a single texture in production, and are either continuously hard or continuously soft from baking through storage.

By "substantial textural equilibrium" is meant the point at which those physico-chemical and structural features responsible for texture, and those physico-chemical and structural processes responsible for changes in texture have reached an approximately steady state relative to the expected usable life and storage conditions of the product.

By "cookie ingredients" is meant those ingredients commonly used in cookies, namely, sugar, flour, water, and shortening, as well as those additional flavoring and texturing ingredients desired in the particular system being formulated. Such latter ingredients would include nutmeats, cereals, raisins, and chocolate chips, as well as egg, vanilla, cinnamon, cocoa, and the numerous other similar materials commonly found in cookies, as desired.

By "flour" is meant the finely comminuted meal of any cereal grain or edible seed. Typical non-limiting examples are wheat flour, barley flour, rye flour, corn starch and corn flour, but also encompassed by this term as used herein are the so-called synthetic flours, which incorporate such materials as starch and soy protein isolate, with or without heat and/or steam treatment.

By "shortening" is meant edible fats and oils suitable for cooking or baking, as well as combinations of edible fats and/or oils with appropriate food grade emulsifiers, such as polyglycerol esters, sucrose monoesters, mono- and diglycerides, lecithins, egg yolk and other phospholipids, and the like. In some cases, the materials useful herein as sugar crystallization inhibitors will also be effective as emulsifiers, and can serve a dual purpose. Also included are oleaginous products such as butters and margarines.

The term "water activity" ($a_w$) is used herein in its usual context to mean the ratio of the fugacity of water in the system being studied (f) to the fugacity of pure water ($f_o$) at the same temperature. The water activity of the products and compositions herein can be measured using well-known physical chemical techniques and commercially available instruments.

By "readily crystallizable sugar" is meant a mono- or disaccharide, or mixture of mono- and/or disaccharides, that readily and spontaneously crystallizes at the water content and water activity conditions encountered in semi-moist cookies of the home-baked type. Sucrose is virtually unique among the readily available food sugars in this regard, crystallizing spontaneously at $a_w$ levels from about 0.25 to 0.8 in normal cookie systems. Mixtures of readily crystallizable sugars with other mono- and/or disaccharides, where readily crystallizable sugars comprise over 85% of the total sugar, exhibit crystallization behavior similar to a pure readily crystallizable sugar.

By "sugar crystallization inhibitor" is meant a compound or composition which inhibits sucrose or other readily-crystallizable sugar crystallization in the baked cookie, so that the sugar crystallizes, at the water content and water activity encountered in semi-moist cookies of the home-baked type, substantially more slowly than the same sugar would under the same conditions in the absence of the inhibitor, preferably remaining uncrystallized for periods of at least 1-6 months. Particularly good sugar crystallization inhibitors include food-compatible polyols, such as sugar alcohols, sugar esters, sugar polymers, glycols, polyglycerols, polyglycerol esters, and starch hydrolysates. The sugar alcohols comprise a well known group of compounds, including sorbitol, mannitol, maltol and xylitol. Sugar esters comprising the disaccharide monoesters of the $C_{12}$–$C_{22}$ fatty acids, such as sucrose mono-oleate, can be employed. The sugar polymers including dextrins and cellulose are also useful. Other possible crystallization inhibitors include glycerol, polyglycerols, and polyglycerol esters having an average of two to ten glycerol units per polyglycerol moiety. The esters are preferably prepared with saturated fatty acids containing 14 to 22 carbon atoms. In any event, the crystallization inhibition capability and effective level of any material can be readily determined without undue experimentation by storage of mixtures of the material with the desired readily crystallizable sugar, either in standard solutions or in the intended cookie dough or crumb system. Crystallization can then be determined either by direct observation of crystal formation or by common X-ray diffraction techniques.

By "food-compatible" herein is meant that the crystallization inhibitor is safe, non-toxic, and effective for its intended use, and presents no unacceptable, disagreeable, or interfering flavor, appearance or texture in the particular formulation in which it is employed.

"Monosaccharides" and "disaccharides" as used herein are compounds well known to the art. Monosaccharides have the empirical formula $(CH_2O)_n$, where $n \geq 3$. The carbon skeleton of the common monosaccharides is unbranched and each carbon except one bears an —OH group; the remaining carbon is generally combined in an acetal or ketal linkage. Hexoses, both aldose and ketose forms, straight chain and pyranose or furanose forms, are preferred herein. The ketohexoses include psicose, fructose, sorbose, and tagatose. The aldohexoses include allose, altrose, glucose, mannose, gulose, idose, galactose, and talose.

Disaccharides consist of two monosaccharides joined by a glycosidic linkage. The most common disaccharides are maltose, lactose, and sucrose.

By "double chocolate cookie" is meant a cookie which contains both cocoa as a dough ingredient, and chocolate chips, Toll House TM morsels, or the like.

The term "matrix" is used herein to indicate that the ingredients in a typical cookie formulation are not all mutually soluble, so that, while the cookie dough and- /or crumb portion may appear relatively homogeneous macroscopically, at the microscopic level specific starch granules, pockets of syrup, crystals of sugar, oil droplets, inclusions, etc., can be identified.

By "baking" herein is meant radiant, conductive, or convective exposure to energy of a type which imparts thermal energy to the product being baked. It thus includes conventional, convection and microwave oven baking.

The term "laminated" is used herein to indicate discrete regions of one or more textures in a baked product, specifically discrete regions of crisp and chewy textures. It includes but is not limited to superimposed layers of one or more materials.

The term "crisp and chewy texture" is used herein to indicate that texture which exists in a fresh, home-baked cookie wherein the outside surface is friable or brittle and the interior is ductile and pliant. This texture can be quantified mathematically and exists when:

$$\left[ \log \max. \left( \frac{\text{stiffness}}{\text{plasticity}} \right) - \log \min. \left( \frac{\text{stiffness}}{\text{plasticity}} \right) \right] \geq 1.75$$

where stiffness is a measure of stress vs. deformation, and plasticity is a measure of the tendency of the cookie crumb to plastic flow. Regions of a high stiffness:low plasticity ratio of at least about 2, are denoted as crisp. Regions of a low stiffness:high plasticity ratio of less than about 0.5, are denoted as chewy. Since crumbs with stiffness:plasticity ratios of less than about 2 and greater than about 0.5 exist, it is preferable to define the cookies herein in terms of the texture difference, expressed as the difference between the logarithm of the maximum stiffness:plasticity ratio and the logarithm of the minimum stiffness:plasticity ratio. A method for measuring this texture is detailed in Case Ser. No. 240,051, issuing as U.S. Pat. No. 4,374,862 on Feb. 22, 1983; said method is herein incorporated by reference.

The term "chewy dough" is used to denote a dough that will have a chewy texture after baking and equilibrating.

The term "crisp dough" is used to denote a dough that will have a crisp texture after baking and equilibrating.

All percentages herein are by weight, unless otherwise indicated.

DESCRIPTION OF A PREFERRED EMBODIMENT

In its preferred execution, the present invention provides a dough-based, ready-to-bake sweetened food product which, when baked, has a substantially homogeneous cross-section with respect to flavor and appearance and a shelf-stable cross-sectional texture variability typical of freshly baked cookies, and the cookies made therefrom. This invention further provides a process for inhibiting crystallization of a readily crystallizable sugar contained in a dough-based food product by adding an effective amount of a crystallization inhibitor.

The dough product of the present invention is made by the process of preparing a first cookie dough from typical cookie ingredients containing a sucrose or solution thereof as disclosed herein plus an effective amount of a sugar crystallization inhibitor for the sucrose, preparing a second cookie dough, containing a sucrose or solution thereof also as disclosed herein, and substantially enveloping said first dough with a layer of said second dough, thereby forming a ready-to-bake, laminated dough structure.

Laminated dough structures can be made according to the foregoing process, wherein one or both doughs further comprise a member selected from the group consisting of cereals, nutmeats, peanut butter, cocoa, raisins, chocolate chips, and butterscotch chips, and mixtures thereof. Nutmeats include the whole or chopped meat of any edible nut, including walnuts, black walnuts, hickory nuts, hazel nuts, brazil nuts, peanuts, macadamia nuts, pecans, almonds, cashews, and the like. Another nutmeat especially suitable for use in cookies is coconut.

The sugar component of the first cookie dough, which has a chewy texture after baking, used in making laminated dough structures consists essentially of a readily crystallizable sugar, such as sucrose or a solution thereof. The first dough also contains an amount of a sugar crystallization inhibitor for sucrose effective to inhibit the crystallization of sucrose after baking. The classes of compounds comprising the sugar crystallization inhibitor include food-compatible polyols such as sugar alcohols, sugar esters, sugar polymers, glycerols, polyglycerols, polyglycerol esters, and starch hydrolysates, as previously defined.

The sugar component of the second cookie dough, which has a crisp texture after baking, used in making a laminated dough structure also consists essentially of a readily crystallizable sugar, preferably sucrose or a solution thereof. Readily crystallizable sugars include sucrose and mixtures of sucrose and other mono- and disaccharides which comprise at least 75%, preferably at least 80%, most preferably at least 85% sucrose by weight.

The baked food products of the present invention, i.e., cookies, are made by a process described hereinabove, which process further comprises the step of baking the laminated dough structure, preferably to a final water activity, $a_w$, of from about 0.25 to about 0.8, most preferably from about 0.3 to about 0.55. While not intended to be limited by past practice, cookie baking times typically range from about five minutes to about fifteen minutes, depending on the number of cookies being baked, the size and shape of the cookie, the cookie ingredients, oven temperature, and like factors. The baking process is straightforward, no modifications being needed for the practice of this embodiment. Baking can either be performed in the batch mode, as is typically done in the home, or in continuous fashion, as is often done in commercial bakeries.

A variety of cookies can be produced by the foregoing process, depending, of course, upon the adjunct ingredients used in preparing the doughs, including sugar cookies, oatmeal cookies, peanut butter cookies, chocolate chip cookies, and double chocolate chip cookies.

The crystallization inhibiting process of the present invention preferably comprises adding an effective amount of a crystallization inhibitor as an ingredient in the preparation of the first dough which will be substantially enveloped within a layer of second dough containing no crystallization inhibitor. The crystallization inhibitor comprises a food-compatible polyol. The effective level of inhibitor will vary somewhat with dough formulation, but in general the inhibitor should replace from about 10% to about 100% of the total weight of readily crystallizable sugar in any specific formulation. The preferred level of substitution for maximum crystallization inhibition is from about 25% to about 90% of the total weight of readily crystallizable sugar. For the laminated cookies of the present invention the inhibitor replaces from about 10% to about 100%, preferably from about 25% to about 90%, of the crystallizable sugar in the chewy inner dough formula.

While the foregoing illustrates one preferred mode of practicing this embodiment of the present invention, other, potentially less preferable executions of this embodiment of the invention can also be practiced.

In some cookie formulations, depending upon the baking processes employed, it may not be necessary to cover the entire surface of the crystallization-inhibitor-containing dough with the readily crystallizable sugar-containing dough. For example, the bottom surfaces of cookies baked on metal cookie sheets are heated directly by conduction through a medium which has high heat conductivity, while the remainder of such cookies are heated via the less efficient processes of radiation and convection. Thus, the bottom surface of dough which is baked on a metal baking sheet will be crisper, when the cookie is removed from the oven, than the remainder of the cookie, even if the dough contains crystallization-resistant sugar. Accordingly, the present invention also provides a ready-to-bake sweetened food product, which, when baked, has a substantially homogeneous cross-section with respect to flavor and appearance and a shelf-stable cross-sectional texture variability typical of freshly baked cookies, comprising a discrete body of a first cookie dough which comprises sucrose, a sugar crystallization inhibitor for sucrose, and flour and shortening, and a lamina of a second cookie dough superposed on at least a portion of the surface of said first cookie dough, said second cookie dough comprising sucrose and flour and shortening, thereby forming a laminated dough structure.

It can also be appreciated that the present invention offers the opportunity to make entirely crumb-continuous cookies which provide the crisp exterior/chewy interior typical of home-style cookies, but in which various regions differ substantially in flavor and/or appearance. For example, a chocolate flavored crisp dough can be laminated onto a peanut butter flavored chewy dough to produce a "peanut butter cup" cookie. Such cookies are also encompassed by the present invention.

Laminated dough structures may be formed by a variety of techniques, such as by applying a layer of crisp cookie dough to only the top part of a mass of chewy cookie dough; by embedding particles or granules of crisp cookie dough in a body of chewy cookie dough, or vice versa; by winding or otherwise distributing strands of extruded crisp cookie dough upon the surface of a ball of chewy cookie dough; by laminating alternating sheets of crisp and chewy doughs and rolling and slicing to form a "pinwheel" structure; and a variety of other techniques well within the grasp of those in the food production art.

Of course, it will be recognized that the cookies of this invention can be used as the biscuit or crumb portion of a sandwich or filled cookie. The biscuit areas will maintain their textural diversity when incorporaed into these structures.

It can also be appreciated that each of the processes disclosed herein for making the products of this invention, while described in some cases as being performed by hand, can be adapted to high speed automation. Examples of applicable techniques include those used for making ravioli, fig bars, and filled candies.

FORMULATION

Sugar, flour, water and shortening, when combined in almost any reasonable proportions, will produce a dough that can be baked to form a cookie—the classic "sugar cookie". Of course, the sweetness, texture and similar organoleptic properties of the cookie will depend upon the ratio of sugar/flour/water/shortening. In general, any cookie recipe which produces an organoleptically acceptable crumb-continuous cookie (as opposed to filled, iced and sandwich-type cookies) can be employed in the practice of the present invention. Some such recipes will incorporate additional ingredients. For example, oatmeal cookies generally contain rolled oats to provide their characteristic flavor and texture. Peanut butter cookies will, of course, contain peanut butter, which provides not only the distinctive flavor of peanut butter, but also oils (shortening) and peanut solids which supply both carbohydrates and proteins, similar to flour. Within limits, well known to the art, materials which "interrupt" the homogeneous composition of the typical cookie can be introduced into the formulation. These materials are essentially inert, so far as the chemistry of the cookie dough is concerned. Examples of such materials, referred to hereinafter as "inclusions", are chopped nuts, chocolate chips or Toll House TM morsels, coconut, butterscotch chips, oatmeal, peanut butter chips, raisins, and the like. Even in simple cookies, such as sugar cookies, it may be desirable to incorporate additional flavoring materials, such as spices.

The ratio (w/w) of chewy dough to crisp dough (exclusive of inclusions) is important in producing an appropriate textural cross section in the finished cookie. For example, the typical home-baked cookie currently made can be considered a 0:1 ratio chewy dough:crisp dough cookie, and after aging is undesirably hard and crumbly throughout. On the other hand, a cookie made entirely from dough containing crystallization inhibitor throughout could be characterized as a 1:0 chewy dough:crisp dough cookie, which lacks the desirable surface crispness of the typical home-baked cookie. The laminated dough structures of the present invention are generally made to contain from about 0.2:1 chewy dough:crisp dough to about 5:1 chewy dough:crisp dough, preferably from about 0.7:1 to about 2:1. At ratios of less than 0.2:1, the water-starved crisp dough tends to rob moisture from the chewy dough, degrading its normally chewy eating texture. Conversely, at ratios greater than about 5:1, the regions of crisp dough must be made very small in comparison to the relatively large volume of chewy dough, and thus become difficult to work with. In addition, since the doughs have limited structural integrity, it is very likely that the chewy dough will break through the thin crisp dough as the laminated dough structure softens during baking, and discrete regions of dough will not be maintained. Most preferred from the standpoint of product texture and ease of manufacture, is a chewy dough:crisp dough ratio of about 1.3:1.

Both the chewy dough and crisp dough employed in producing the laminated dough structures of the present invention are amenable to the sort of formula modifications commonly employed in the baking art. In particular, in the practice of the present invention, it is desirable to incorporate such materials as dough conditioners into the crisp dough to reduce crumbliness and improve browning characteristics. Two additives, fructose and the calcium salt of stearoyl 2-lactylate, appear to improve crumbliness in aged cookies of this invention. These are incorporated in the crisp dough in minor proportions, generally less than about 5% fructose (total sugar weight basis) and/or less than about 5% calcium stearoyl 2-lactylate (fat weight basis, which equals about 1.2% by weight of the total dough system). The fructose level in the crisp dough must be kept sufficiently low that the sucrose in the crisp dough remains readily crystallizable. Most preferred is about 2% fructose (sugar basis). A suitable antioxidant can also be incorporated into the dough formulas to aid in preserving the baked product. In addition, an artificial sweetener can be added to the chewy dough in order to maintain the desired level of sweetness in those cases where all or a high percentage of the sugar has been replaced with a sugar crystallization inhibitor.

Handling and baking characteristics of the crisp dough can also be improved substantially by use of somewhat higher flour levels.

In addition, the laminated dough structure system offers the opportunity for further formula modifications which enhance the cross-sectional texture variability of the cookie. For example, an inner, chewy dough can be formulated to be much shorter than an outer, crisp dough, or with shortening having a lower melting point than that of the crisp dough. Such chewy doughs would normally bake into unacceptable cookies because of their relatively thin consistency and consequent lack of structural integrity during baking. When baked, they would spread or run undesirably, becoming unacceptably browned and crisp as a result. However, such doughs, when used as the chewy dough of a laminated dough structure, can easily be baked, because the outer, crisp dough acts as a container or shell for the chewy dough during the early part of the baking process. Toward the end of the baking process, the shell of outer dough collapses around the inner, chewy dough to form a familiar cookie of apparent unitary structure and composition, but in which the center is exceptionally rich and chewy.

Cookies of this invention are made by manipulation of sugar crystallization. This process sometimes requires a "tempering" period prior to reaching textural equilibrium, when the crystallizable sugar is in transition from the amorphous (glass) form to the crystalline form. During this period, the crisp dough regions will soften slightly and then become crisp again.

The following examples illustrate the broad range of industrial applicability of the present invention, without intending to be limiting thereof. It will be appreciated that other modifications of the present invention, within the skill of those in the baking arts, can be undertaken without departing from the spirit and scope of this invention.

EXAMPLE 1

| Ingredients | Weight Percent |
| --- | --- |
| Crisp Outer Dough | |
| Hydrogenated vegetable shortening | 23.3 |
| Granulated sugar | 17.5 |
| Brown sugar | 17.5 |
| Fresh egg yolk | 4.2 |
| Dried egg albumen | 0.7 |
| Water | 6.3 |
| Flavoring | 0.6 |
| Flour | 28.9 |
| Salt | 0.5 |
| Baking soda | 0.5 |
| Chewy Inner Dough | |
| Hydrogenated vegetable shortening | 19.4 |
| Granulated sugar | 14.6 |
| Sucrose mono-oleate | 14.6 |
| Fresh egg yolk | 3.5 |
| Dried egg albumen | 0.6 |
| Water | 5.2 |
| Flavoring | 0.5 |
| Flour | 24.1 |
| Salt | 0.4 |
| Baking soda | 0.4 |
| Chocolate chips | 16.7 |

The crisp outer dough was prepared by first mixing the water and liquid ingredients with the shortening, adding the sugar, and creaming the mixture. The flour and other minor dry ingredients were then added and mixed.

The chewy inner dough was prepared by mixing the water and liquid ingredients with the shortening, adding the sugar and mono-oleate, and creaming the mixture. The flour and other minor dry ingredients were then added and mixed. Finally the chocolate chips were mixed into the dough composition.

The outer dough was rolled to a desired thickness of about 0.02 to about 0.32 cm. For each cookie, two discs of outer dough were cut, one with a 5 cm. diameter, the other having a 4 cm. diameter. The inner dough was made into a ball and placed on top of the 4 cm. disc of outer dough. The 5 cm. disc of outer dough was placed over the ball of inner dough. The edges of the two discs of outer dough were crimped to seal the inner dough within. The laminated dough pieces were then hand rolled to a hemispherical shape to form dough preforms. The dough preforms were baked for 8½ minutes at approximately 375° F. (191° C.). The cookies were sealed in a jar and aged.

In addition, uniform substantially hemispherical shaped deposits of inner dough, without any outer dough, were placed upon a sheet for baking by means of a measuring scoop, and were baked for about 8½ minutes at approximately 375° F. (191° C.). These cookies, comprised solely of baked inner dough, were prepared for the X-ray diffraction analyses. The cookies were sealed in a jar and aged for 32 days.

| Ingredients | Weight Percent |
| --- | --- |
| Toll House TM Reference | |
| Hydrogenated vegetable shortening | 19.4 |
| Granulated sugar | 14.6 |
| Brown sugar | 14.6 |
| Fresh egg yolk | 3.5 |
| Dried egg albumen | 0.6 |
| Water | 5.2 |
| Flavoring | 0.5 |
| Flour | 24.1 |
| Salt | 0.4 |
| Baking soda | 0.4 |
| Chocolate chips | 16.7 |

The reference dough was prepared by first mixing the water and liquid ingredients with the shortening, adding the sugars, and creaming the mixture. The flour and other minor dry ingredients were then added and mixed. The chocolate chips were mixed in last. Uniform substantially hemispherical shaped deposits of dough were placed upon a sheet for baking by means of a measuring scoop, and were baked for about 8½ minutes at approximately 375° F. (191° C.). The cookies were sealed in a jar and aged for 32 days.

The reference cookies and the cookies comprising only baked inner dough containing sucrose mono-oleate were than analyzed for the presence of sugar crystals by means of X-ray diffraction. Each atom in a crystal has the power of scattering an X-ray beam incident on it. The sum of all the scattered waves in the crystal results in the X-ray beam being, in effect, diffracted from each allowed crystal plane. Every crystalline substance scatters the X-rays in its own unique diffraction pattern, producing a "fingerprint" of its atomic and molecular structure. A General Electric XRD-5 X-ray Diffractometer was used to analyze the cookies. Samples were inserted into the sample tray, instrument settings were optimized, and diffraction patterns obtained in accordance with the manufacturer's XRD-5 Instruction Manual. The initial peak obtained (peak on far right side of each figure) represents engagement of the instrument and is not representative of crystal structure. In general, for all remaining peaks present, the peak height is a measure of intensity with higher intensities resulting from the presence of a greater number of crystals.

FIG. 1 represents the pattern resulting from the reference Toll House TM Cookies. The several peaks represent sugar crystals detected by means of the X-ray analysis. FIG. 2 represents the pattern resulting from the cookies comprised solely of inner dough containing sucrose mono-oleate. The absence of sharp peaks indicates the absence of sugar crystals. This demonstrates that sucrose mono-oleate is an effective sugar crystallization inhibitor.

Taste tests by expert flavor panelists confirmed that the laminated cookies containing the sucrose mono-oleate had discrete regions of chewy texture and of crisp texture. The texture was that of a freshly baked cookie having a crisp outside surface and a chewy interior. This dichotomy of textures was absent from the reference cookies, which were crisp throughout.

EXAMPLE 2

| Ingredients | Weight Percent |
| --- | --- |
| Chewy Inner Dough | |
| Hydrogenated vegtable shortening | 19.5 |
| Granulated sugar | 14.6 |
| Polyol 6075* | 18.3 |
| Fresh egg yok | 3.5 |
| Dried egg albumen | 0.6 |
| Water | 1.6** |
| Flavor | 0.5 |
| Flour | 24.1 |
| Salt | 0.4 |
| Baking soda | 0.4 |
| Chocolate chips | 16.5 |

*Manufactured by Lonza, Inc., Lonza, Inc. Marketing Services Dept., 22-10 Route 208, Fair Lawn, N.J. 04710
**Adjusted to accommodate 20% water in Polyol 6075.

The chewy inner dough was prepared by mixing the water and liquid ingredients with the shortening, adding the sugar and polyol, and creaming the mixture. The flour and other minor dry ingredients were added and mixed. The chocolate chips were then added and mixed. Uniform substantially hemispherical shaped deposits of inner dough, without any outer dough, were placed on a sheet for baking by means of a measuring scoop and were baked as in Example 1. The cookies were sealed in a jar and underwent accelerated aging for 2 days.

The outer dough formula and mixing were the same as in Example 1. Laminated dough preforms were prepared and baked as in Example 1. The laminated cookies were sealed in a jar and aged.

A separate batch of cookies were prepared using the above formula and procedures except that Polyol HM75 was substituted for Polyol 6075. Both are starch hydrolysates manufactured by Lonza, Inc. The cookies made only from inner dough were sealed in a jar and underwent accelerated aging for 2 days. The laminated cookies were also sealed in a jar and aged.

The above cookies, made only from inner dough, were analyzed for the presence of sugar crystals by X-ray diffraction using the method of Example 1. FIG. 3 represents the diffraction pattern obtained from the cookies containing Polyol 6075. FIG. 4 represents the diffraction pattern obtained from the cookies containing Polyol HM75. Comparison of FIGS. 3 and 4 with FIG. 1 demonstrates crystallization inhibition by the polyols. The overall patterns of FIGS. 3 and 4 show a decrease in the number and intensity of peaks which corresponds to decrease in the occurrence of sugar crystals in the cookies.

Taste tests by expert flavor panelists of the laminated cookies confirmed that the laminated cookies containing the polyols had a crisp outside surface and chewy interior comparable to the texture of freshly baked cookies.

EXAMPLE 3

| Ingredients | Weight Percent |
| --- | --- |
| Chewy Inner Dough | |
| Hydrogenated vegtable shortening | 19.5 |
| Granulated sugar | 14.6 |
| Glycerine, U.S.P. | 18.3 |
| Fresh egg yolk | 3.5 |
| Dred egg albumen | 0.6 |
| Water | 1.6* |
| Flavorings | 0.5 |
| Flour | 24.1 |
| Salt | 0.4 |
| Baking soda | 0.4 |
| Chocolate chips | 16.5 |

*Adjusted to accommodate 20% water in glycerine, U.S.P.

The chewy inner dough was prepared as in Example 2 using the above formula. Cookies made only of inner dough were baked as in Example 1. Outer dough was prepared using the formula and mixing procedure as in Example 1. The dough preform assembly for laminated cookies and baking conditions were the same as in Example 1. The cookies made only from inner dough were sealed in a jar and aged for 46 days. An X-ray diffraction analysis was performed on these cookies using the method of Example 1. The laminated cookies were also sealed in a jar and aged.

Figure 5:
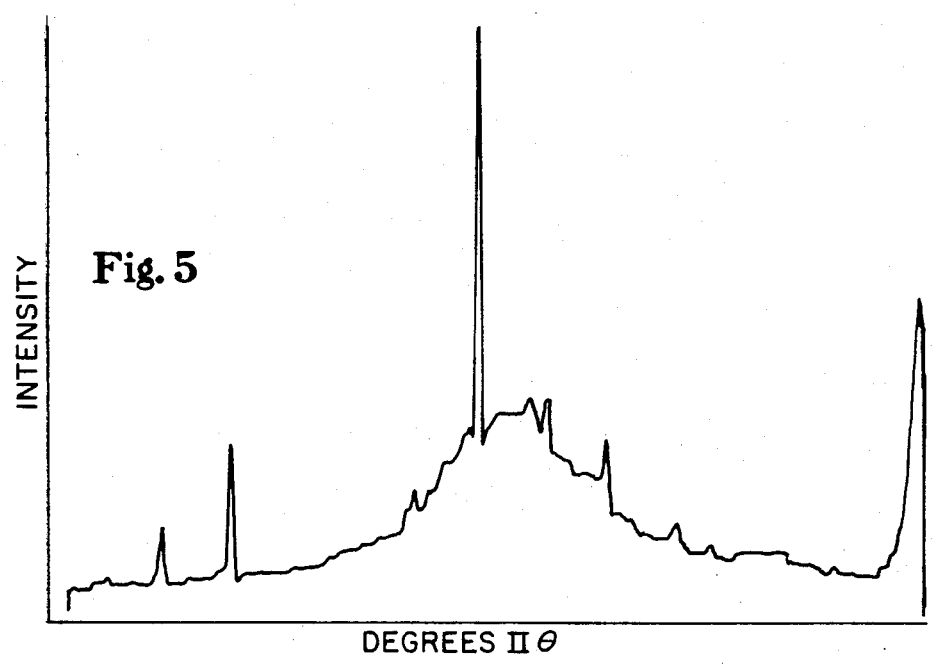
FIG. 5 represents an X-ray diffraction pattern of the aged cookies of Example 3 comprised solely of baked inner dough wherein the inner dough formula is equivalent to the Toll House TM formula except that 50% by weight of the sucrose was replaced with glycerine. Viewing the pattern from right to left, the initial peak of the figure represents engagement of the instrument and is not representative of crystal structure. A comparison of the overall pattern to that of FIG. 1 illustrates effective inhibition of sugar crystallization.

FIG. 5 represents the X-ray diffraction pattern obtained for the cookies made only from inner dough containing glycerine. Although a couple of sharp peaks appear indicating the presence of sugar crystals, the overall pattern when compared to that of FIG. 1 demonstrates that fewer sugar crystals occurred overall, and thus sugar crystallization was inhibited.

Taste tests by expert flavor panelists of the laminated cookies confirmed that the laminated cookies containing the glycerine had a crisp outside surface and chewy interior comparable to the texture of freshly baked cookies.

What is claimed is:

1. A sweetened food product in the form of a cookie dough preform, which, when baked, provides a storage-stable plurality of textures, comprising a crumb-continuous matrix made from cookie ingredients, and characterized in having distributed therein discrete regions of dough containing readily crystallizable sugar, and discrete regions of dough containing readily crystallizable sugar and a sugar crystallization inhibitor for the readily crystallizable sugar, whereby the product, when baked, provides a storage-stable plurality of textures, the regions containing crystallization inhibitor providing a chewy texture, and the regions not containing crystallization inhibitor providing a crisp texture.

2. A product according to claim 1 wherein the readily crystallizable sugar is sucrose or a mixture of sucrose and other mono- or disaccharides comprising at least 75% sucrose by weight.

3. A product according to claim 2 wherein the sugar crystallization inhibitor is a food-compatible polyol.

4. A product according to claim 3 wherein the sugar crystallization inhibitor is a member selected from the group consisting of sugar esters, sugar alcohols, sugar polymers, glycols, polyglycerols, polyglycerol esters, and starch hydrolysates.

5. A product according to claim 4 wherein the sugar crystallization inhibitor is glycerol.

6. A product according to claim 4 wherein the sugar crystallization inhibitor is sucrose mono-oleate.

7. A product according to claim 4 wherein the sugar crystallization inhibitor is sorbitol.

8. A product according to claim 4 wherein the sugar crystallization inhibitor is polydextrose.

9. A product according to claim 4 wherein the sugar crystallization inhibitor is a starch hydrolysate.

10. A product according to claim 1 wherein the sugar crystallization inhibitor is present at a level equal to from about 10% to about 100% by weight of the readily crystallizable sugar contained in the chewy texture regions.

11. A product according to claim 12 wherein the sugar crystallization inhibitor is present at a level equal to from about 25% to about 90% by weight of the readily crystallizable sugar contained in the chewy texture regions.

12. A product according to claim 1 wherein the weight ratio of dough providing a chewy crumb to dough providing a crisp crumb is in the range from about 0.2:1 to about 5:1.

13. A product according to claim 12 wherein the weight ratio of doughs is from about 0.7:1 to about 2:1.

14. A product according to claim 1 which further comprises a member selected from the group consisting of cereals, nutmeats, peanut butter, cocoa, raisins, chocolate chips, and butterscotch chips, and mixtures thereof.

15. A dough-based, ready-to-bake, sweetened food product in the form of a laminated dough structure, which, when baked, has a substantially homogeneous cross-section with respect to flavor and appearance and a shelf-stable cross-sectional texture variability typical of freshly baked cookies, comprising:
 (a) a discrete body of a first cookie dough which comprises
  (i) a sugar crystallization inhibitor component and
  (ii) flour, water and shortening, and
 (b) a lamina of a second cookie dough superposed on at least a portion of the surface of said first cookie dough, said second cookie dough comprising
  (i) a readily crystallizable sugar component, and
  (ii) flour, water and shortening.

16. A laminated dough structure according to claim 15 wherein the lamina of second cookie dough is superposed continuously across the entire surface of said first cookie dough.

17. A laminated dough structure according to claim 15 wherein the sugar crystallization inhibitor comprises a food compatible polyol.

18. A laminated dough structure according to claim 15 wherein the readily crystallizable sugar is a member selected from the group consisting of sucrose, and mixtures of sugars containing greater than about 75% sucrose by weight, and solutions thereof.

19. A baked, laminated dough structure according to claim 15.

20. A method for making a laminated dough structure comprising: preparing a first cookie dough from typical cookie ingredients comprising a sugar crystallization inhibitor component and flour and shortening; preparing a second cookie dough comprising a readily crystallizable sugar component and flour and shortening and applying a layer of said second dough to said first dough, thereby forming a laminated dough structure.

21. A baked, sweetened food product in the form of a cookie, comprising a crumb-continuous matrix made from cookie ingredients, and characterized in having distributed therein discrete regions of crumb containing crystallized sugar and discrete regions of crumb containing uncrystallized readily crystallizable sugar and a sugar crystallization inhibitor for the readily crystallizable sugar, whereby the product provides a storage-stable plurality of textures, the regions containing crystallized sugar providing a crisp texture and the regions containing uncrystallized sugar providing a chewy texture.

22. A product according to claim 21 wherein the readily crystallizable sugar is sucrose or a mixture of sucrose and other mono- or disaccharides comprising at least 75% sucrose by weight.

23. A product according to claim 22 wherein the crystallization inhibitor is a food-compatible polyol.

24. A product according to claim 23 wherein the sugar crystallization inhibitor is a member selected from the group consisting of sugar esters, sugar alcohols, sugar polymers, glycols, polyglycerols, polyglycerol esters, and starch hydrolysates.

25. A product according to claim 23 wherein the sugar crystallization inhibitor is present at a level equal to from about 10% to about 100% by weight of the readily crystallizable sugar contained in the chewy texture regions.

26. A product according to claim 23 wherein the sugar crystallization inhibitor is present at a level equal to from about 25% to about 90% by weight of the readily crystallizable sugar contained in the chewy texture regions.

27. A method for making a cookie having a shelf-stable cross-sectional texture variability typical of freshly baked cookies, according to claim 20, which method further comprises the step of baking said laminated structure.

28. A method for making a cookie according to claim 21 comprising the steps of:
   (1) forming a portion of dough, which, when baked, provides a stable, crisp texture;
   (2) forming a portion of dough, which, when baked, provides a stable, chewy texture;
   (3) separately baking the dough portions; and
   (4) adherently contacting the baked dough portions substantially immediately after baking, to form a single cookie.

29. A method for inhibiting crystallization of a readily crystallizable sugar contained in a dough-based food product comprising adding an effective amount of a sugar crystallization inhibitor to the dough.

30. A method according to claim 29 wherein the sugar crystallization inhibitor is added after baking the dough.

31. A method according to claim 29 wherein the readily crystallizable sugar comprises sucrose or a mixture of sucrose and other mono- or disaccharides comprising at least 75% sucrose by weight.

32. A method according to claim 29 wherein the crystallization inhibitor comprises a food compatible polyol.

33. A method according to claim 32 wherein the sugar crystallization inhibitor is added at a level equal to from about 10% to about 100% by weight of the readily crystallizable sugar.

34. A method according to claim 33 wherein the sugar crystallization inhibitor is added at a level equal to from about 25% to about 90% by weight of the readily crystallizable sugar.

35. A method according to claim 32 wherein the sugar crystallization inhibitor is a member selected from the group consisting of sugar esters, sugar alcohols, starch hydrolysates, glycols, polyglycerols, polyglycerol esters, polydextrins and cellulose.

* * * * *